Jan. 24, 1933.   F. D. PELTIER   1,895,084

FLOAT VALVE

Filed Aug. 9, 1930

Inventor;
Frank D. Peltier
A. Yates Dowell
Atty.

Patented Jan. 24, 1933

1,895,084

UNITED STATES PATENT OFFICE

FRANK D. PELTIER, OF EVANSVILLE, INDIANA, ASSIGNOR TO SERVEL INC., OF NEW YORK, N. Y., A CORPORATION OF DELAWARE

FLOAT VALVE

Application filed August 9, 1930. Serial No. 474,127.

This invention relates to household refrigerating machines and more particularly to a float valve for controlling the flow of refrigerant to the evaporator for maintaining a constant liquid level within the casing in which the float is mounted.

It is an object of the invention to provide a float valve of simple and inexpensive construction, by means of which purging of the valve chamber and removal of foreign matter from the valve seat may be easily accomplished.

Figure 1:
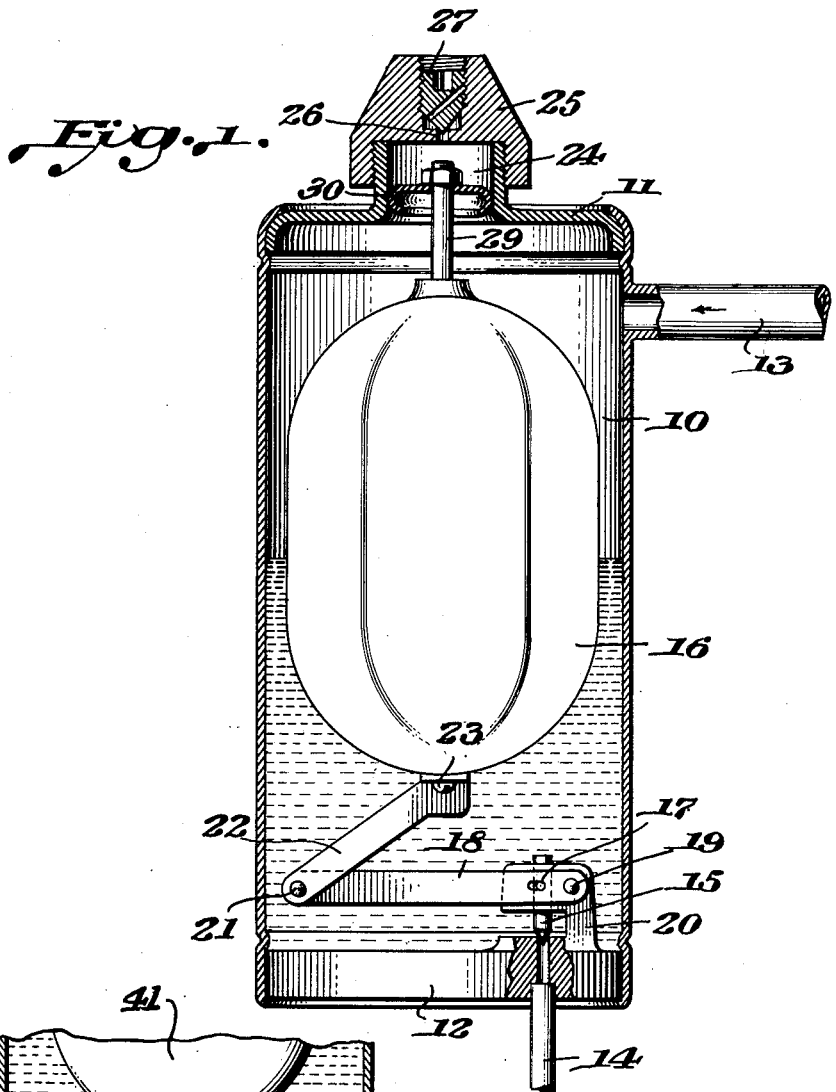

Fig. 1 is a vertical section illustrating one application of the invention; and

Figure 2:
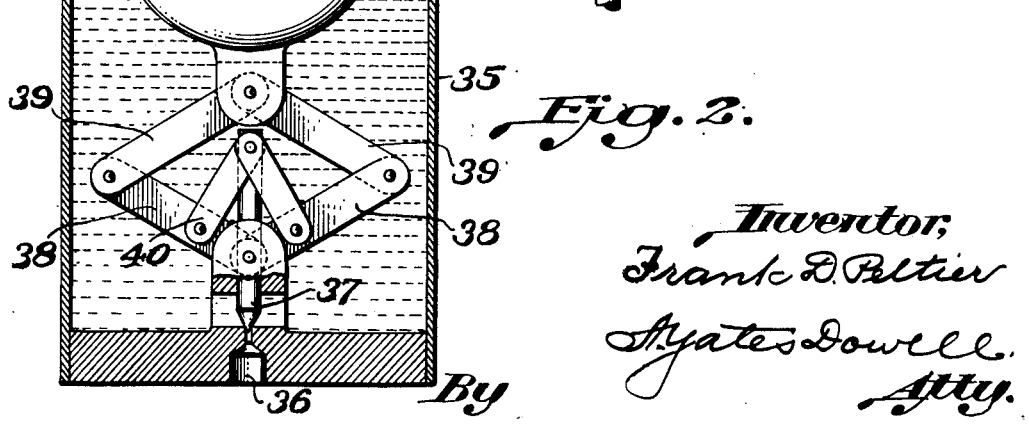

Fig. 2, a fragmentary similar view of a modified construction.

Referring to said drawing in which the same reference characters are used to denote corresponding parts throughout the several views, 10 represents a float chamber which is formed of a sheet metal casing or the like and has upper and lower end plates 11 and 12 secured thereto in any desired manner as for example by crimping and welding. Float chamber 10 is provided with an inlet pipe 13 for the admission of liquid refrigerant from a condenser not shown and a discharge pipe 14 for conducting liquid refrigerant to the evaporator, also not shown. Passage of refrigerant from the inlet pipe 13 from the condenser through the pipe 14 to the evaporator is determined by a float valve 15 controlled by the action of a float 16. The float valve 15 is pivoted at 17 upon a lever 18 which has one end pivoted at 19 upon a fixed member 20, the outer end of such lever 18 being pivoted at 21 to an arm 22 fixed by means of a screw 23 to the float 16. Thus when the float raises or lowers it will impart a corresponding movement to the outer end of the lever 18 and swing said lever on the pivot 19 seating and unseating the valve according to the movement of the float.

In order to remove any foreign matter that may accumulate on the valve seat, means is provided for lifting the float. This is accomplished by providing the upper head 11 of the float chamber with a central cylindrical neck 24 and providing a removable cap 25 for closing the outer end of said neck. The cap 25 is provided with an opening 26, which is closed by a vent valve 27 adapted when the vent valve is retracted, so that it does not close the passage 26, to permit the gas in the upper end of the chamber to pass out to the atmosphere through the pipe 28. The float 16 is provided with a piston rod 29 which has a piston 30 attached to its upper end and movable longitudinally of the cylinder 24 with the rise and fall of the float. The pressure of the gas in the float chamber below the piston 30 is adapted to move the piston and float upwardly when the vent valve is unseated.

In normal operation the refrigerant in liquid form comes through the pipe 13 from the condenser and is retained in the float chamber until the float reaches a predetermined height occasioned by the level of the liquid. If it is desired to purge the float chamber and to clear the valve seat noticeable or occasioned by irregular or improper operation of the machine with which the float is associated, the vent valve 27 may be unscrewed to permit the blowing off of the pressure above the piston 30 and this will cause the pressure below the piston to force the piston upwardly and lift the float and the valve to which it is indirectly connected. A gas bound float may be quickly attended to in this manner. The simplicity of the present device is obvious, no complicated mechanism being employed.

It will be readily apparent that various changes may be made without departing from the spirit and scope of the invention, the particular embodiment being merely illustrative of the invention and not being intended to limit the invention to any particular construction.

In Fig. 2 is shown a fragmentary section of a modified form of linkage which is adapted to guide the float in its movement so that it will move in a straight line on the axial line of the float ball and will not bind against the side of the float chamber and prevent ready operation of the float. Referring to this figure the float chamber 35 is formed with a central aperture 36 at the bottom through which liquid refrigerant is adapted to be discharged, such aperture being controlled by a needle valve 37 connected by means of a plurality of links 38, 39 and 40, with a float 41. The operation of this structure is similar to that shown in Fig. 1. On account of the linkage structure connecting the float with the float valve the valve is caused to move axially of the float chamber and will not interfere with the normal operation of the machine with which the device is associated.

I claim:

1. The combination of a float chamber, means for the admission and discharge of fluid into and from said chamber, means for controlling the discharge of fluid from the chamber, a float operating said discharge controlling means, a piston connected to said float and means for venting the chamber on the remote side of the piston to the atmosphere to permit pressure within the float chamber to move said piston and raise the float to render inoperative the discharge controlling means.

2. The combination of a float chamber, means for the admission and discharge of fluid into and from said chamber, a float for controlling the passage of fluid through the chamber, and a piston carried by said float, said float chamber having a vent valve in one end operable for relieving the pressure on one side of the piston to cause pressure within the float chamber to move said piston and float to unseat said control valve.

3. The combination of a float chamber, means for the admission and discharge of fluid into and from said chamber, a float for controlling the passage of fluid through the chamber, a piston carried by said float, means for venting said chamber to the atmosphere, a valve operated by said float, and a linkage connection between said valve and the float comprising members of equal length projecting toward opposite sides of the valve connected with similar members attached to the float.

4. The combination of a float chamber, means for the admission and discharge of fluid into and from said chamber, a float for controlling the passage of fluid through the chamber, a piston carried by said float, means for venting said chamber to the atmosphere, a valve operated by said float, and a linkage connection between said valve and the float comprising members of equal length projecting toward opposite sides of the valve connected with similar members attached to the float, and an equalized linkage connecting said float and valve.

5. The combination of a float chamber, means for the admission and discharge of fluid into and from said chamber, a float for controlling the passage of fluid through the chamber, a piston carried by said float, means for venting said chamber to the atmosphere, a valve operated by said float, and a linkage connection between said valve and the float comprising members of equal length projecting toward opposite sides of the valve connected with similar members attached to the float, pivoted links connecting said float and valve and causing said float and valve to move axially of said float chamber.

6. A float chamber, a fluid inlet, a fluid outlet, a float controlled valve associated with said outlet, a piston for unseating said valve, and manually operable means for venting said chamber on the side of the piston remote from the valve to the atmosphere to permit pressure within the float chamber to unseat said valve.

In testimony whereof I affix my signature.

FRANK D. PELTIER.